Patented June 26, 1928.

1,674,806

UNITED STATES PATENT OFFICE.

WILLIAM ERNEST STOKES, OF ROCKVILLE CENTER, NEW YORK, ASSIGNOR TO UNITED STATES PROCESSES, INC., OF NEW YORK, N. Y., A CORPORATION OF NEW YORK.

PROCESS OF TREATING ORES.

No Drawing.  Application filed November 18, 1922.  Serial No. 601,864.

This invention relates to a process of treating ores, and aims to provide improvements therein.

The invention provides a process wherein the solubility of ore-constituents to be recovered is produced or increased, wherein the conditions within the ore-mass during heat-treatment favorable to the reaction are improved, and wherein the after-condition of the ore or resulting mass is favorable to physical manipulation such as removal from the furnace and mechanical handling and to later treatment, such as extraction.

According to the present invention a bicarbonate of an alkali metal, either alone or mixed with another reagent or reagents, is mixed with the ore, and the roasting or heating of the ore is carried out in admixture with such bicarbonate. The heating or roasting is ordinarily carried out without exclusion of air.

Sodium bicarbonate is preferably used, owing to its low cost and to the low temperature at which carbon dioxid is liberated.

When the ore mass containing the bicarbonate is heated (above the temperature where carbon dioxid is liberated), carbon dioxid is liberated, which has the effect of agitating the mass, hastening the heat treatment, inducing a decrepitation of the mass, and of readily combining with calcium, frequently found in combination with ores, forming relatively insoluble calcium carbonate, which is stable at temperatures below 700° C., and which liberates further quantities of carbon dioxid at temperatures above the dissociation temperature of calcium carbonate. By the use of the bicarbonate, the heating of the mass to a temperature between 700° and 800° C., at which the alkali-metal will react with the metal to be recovered, and which will be below that at which the alkali-metal of the bicarbonate will react with silica or silicates present in the ore to form alkali-metal silicates, which would fuse and mask the remainder of the ore making extraction difficult and loading the leach with impurities, may be accomplished. The mass after heat treatment is light and powdery, and in favorable condition for removal from a furnace, mechanical handling and further treatment, such as leaching, contrasted with a clinkered, balled, or similar state of many ores which have been subjected to heat treatment.

The alkaline portion of the bicarbonate may unite with a constituent of the ore to form a soluble or more soluble compound, of the said constituent, and the use of the bicarbonate has the further desirable result of producing a clear demarkation between the solubilities of the desired soluble compound containing the constituents to be recovered, and the other constituents of the ore. This may be explained by the fact that the use of the bicarbonate, having a weak acid reaction with indicators, does not disturb the approximate neutrality of the solutions resulting from leaching the treated ore-mass, such as when sodium carbonate is used.

The use of the bicarbonate is especially useful in the treatment of vanadium bearing ores.

A specific procedure, as applied to the treatment of a vanadium ore (Roscoelite or the like) will now be described by way of an example of the process.

The ore is crushed or ground to the desired fineness, and a suitable quantity of a bicarbonate of an alkaline earth metal, preferably sodium bicarbonate, is added, together with another reagent or reagents or not, as may be found desirable. However, in the treatment of vanadium ores the best results, according to my experience, have been obtained by using the bicarbonate in admixture with other reagents, such as sodium nitrate and sodium chloride. The amount of sodium bicarbonate used is varied to advantage, according to the kind of ore treated, but in most vanadium ores I find that use of ten per cent of sodium bicarbonate (based on the weight of the ore) will be sufficient to cause dissociation and form a soluble sodium vanadate. Where other reagents are used, a less proportion of the bicarbonate would be used, depending, of course, largely on the character and quantity of the reagents and character of ore.

After admixture of the bicarbonate the mass is heated. Carbon dioxid is liberated by the sodium bicarbonate when the mass is heated, which dissociation of the carbon dioxid assists in disintegrating or decrepitating the ore, and may assist in the dissociation of the vanadium from substances holding it in combination. Some carbon dioxide may be evolved at a temperature as low as 70° C., but this is a gradual evolution which probably results in the formation of a sesqui carbonate which, as the temperature is increased, is also decomposed, liberating carbon dioxide and water. A vanadate of sodium is formed which is easily leached from the ore. The mass is then preferably leached with water to extract the soluble sodium vanadate.

I find my process gives me a leach very low in impurities, and enables me to dissociate the vanadium from the substances holding it in combination at a much lower temperature than other processes. This admits of much more rapid handling of the roasted ore and effects a great saving in fuel.

As heretofore stated, the mass after the heat treatment is powdery and loose, easily removed from a furnace, easily handled, and in excellent condition for leaching.

In previous processes where sodium carbonate or soda ash is used, great care must be exercised in the roasting of the ore to avoid fusing and to guard against the formation of soluble substances such as silicates of sodium and soluble aluminum compounds, which not only load the leach with impurities but also make it difficult to filter and to remove the vanadium from the ore.

The invention may be applied generally to the treatment of ores, and by procedures otherwise than as herein specifically described.

What is claimed is:—

1. A process of treating ores, comprising roasting an ore but not to its point of fusion in admixture with a bicarbonate of an alkali-metal.

2. A process of treating ores, comprising roasting an ore but not to its point of fusion in admixture with sodium bicarbonate.

3. A process of treating ores, comprising heating an ore of vanadium in admixture with a bicarbonate of an alkali-metal.

4. A process of treating ores, comprising heating an ore of vanadium in admixture with sodium bicarbonate.

5. A process of treating ores, comprising heating an ore of vanadium in admixture with a bicarbonate of an alkali-metal and another reagent.

6. A process of treating ores, comprising heating an ore of vanadium in admixture with sodium bicarbonate and another reagent.

7. A process of treating ores, comprising roasting an ore but not to its point of fusion in admixture with a bicarbonate of an alkali-metal without exclusion of air.

8. A process of treating ores, comprising roasting an ore in admixture with a bicarbonate of an alkali-metal at temperatures not substantially exceeding 800° C., said temperature being below the fusion point of the mixture.

9. A process of treating ores, comprising roasting an ore of vanadium in admixture with a bicarbonate of an alkali-metal at temperatures not substantially exceeding 800° C.

In witness whereof, I have hereunto signed my name.

WILLIAM ERNEST STOKES.